Figure 1:
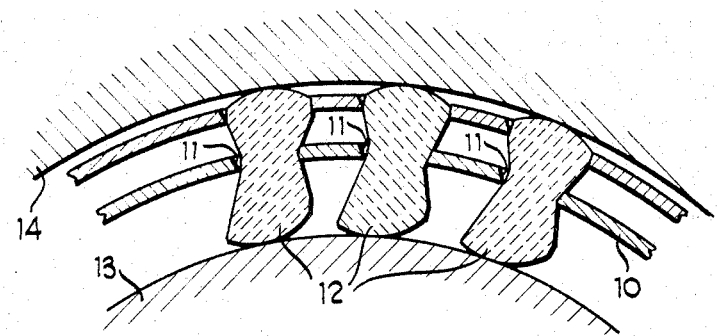

United States Patent [19]
Zimmer

[11] 3,730,316
[45] May 1, 1973

[54] ONE-WAY CLUTCH
[75] Inventor: George A. Zimmer, Ithaca, N.Y.
[73] Assignee: Borg-Warner Corporation, Chicago, Ill.
[22] Filed: Apr. 30, 1971
[21] Appl. No.: 139,073

[52] U.S. Cl. ............192/41 A, 192/45.1, 192/107 M
[51] Int. Cl. ........................F16d 41/07, F16d 13/60
[58] Field of Search .............192/41 A, 45.1, 107 M; 308/238, DIG. 8

[56] References Cited
UNITED STATES PATENTS

| | | | |
|---|---|---|---|
| 1,694,377 | 12/1928 | Lavaud | 192/41 A |
| 3,563,621 | 2/1971 | Gruss | 308/238 |
| 3,428,374 | 2/1969 | Orkin et al. | 308/238 X |
| 3,022,685 | 2/1962 | Armacost | 308/DIG. 8 |
| 3,535,007 | 10/1970 | Klingler | 308/241 |
| 2,745,437 | 5/1956 | Comstock | 138/64 |
| 3,284,144 | 11/1966 | Moore et al. | 308/3 |

Primary Examiner—Allan D. Herrmann
Attorney—Donald W. Banner, William S. McCurry and John W. Butcher

[57] ABSTRACT

A one-way overrunning clutch or freewheel provided with clamping-components, known as sprags, cams and the like, made of ceramic material, such as a high alumina ceramic.

8 Claims, 3 Drawing Figures

Patented May 1, 1973

3,730,316

INVENTOR
GEORGE A. ZIMMER

BY Aubrey L. Burgess
ATTORNEY

ONE-WAY CLUTCH

SUMMARY OF THE INVENTION

This invention relates to a one-way overrunning clutch, sometimes referred to as a freewheel, which has been improved by providing ceramic clamping-components, such as sprags, cams and the like, hereinafter referred to as clamping-components. In order to provide sufficient wear resistance and compressive strength, the presently known one-way clutches typically utilize specially hardened clamping-components. For long wear life a hard surface finish is desired which is provided by nitriding or hard chrome plating of the clamping components. These methods of hardening will form a brittle layer or skin which may crack or spall off. In practice lower hardness through-hardened materials are used such as alloy tool steel and 52100 ball bearing steel. These materials have sufficient hardness to withstand the high normal working stress and therefore eliminate the brittle layer.

Long wear life also requires that the profile of the clamping-component be geometrically correct without surface distortions which would cause excessive localized stresses due to uneven bearing surfaces. Alloy tool steel and 52100 ball bearing steel cannot match the strength and stiffness of a properly selected ceramic and so are not as resistant to distortion.

Some of the highly desirable objectives of this invention are to provide a one-way over-running clutch with ceramic clamping-components whereby these components can be provided with high hardness for wear resistance with no brittle layer, and with a high compressive strength and high modulus of elasticity for increased load-carrying capacity. Further, the provision of ceramic clamping-components in a one-way clutch will provide a clutch which will have a higher maximum permissible operating speed since the heat generated will not affect the hardness of the ceramic as greatly as that of steel. Also, by virtue of the exceptional stiffness and dimensional stability of the ceramic clamping-component in a one-way clutch, the clutch will be possessed of increased accuracy and can be used for indexing applications and the like in which one-way clutches provided with steel clamping components would be inappropriate.

Figure 2:
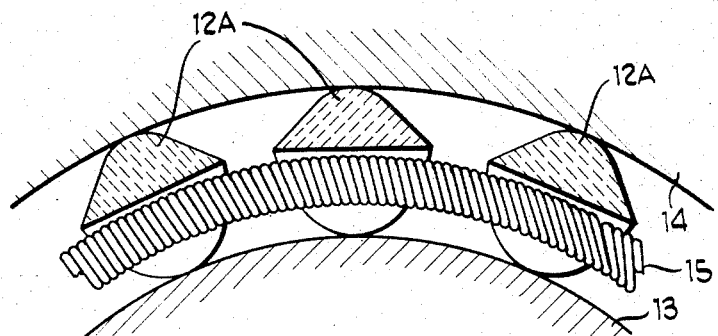
Figure 3:
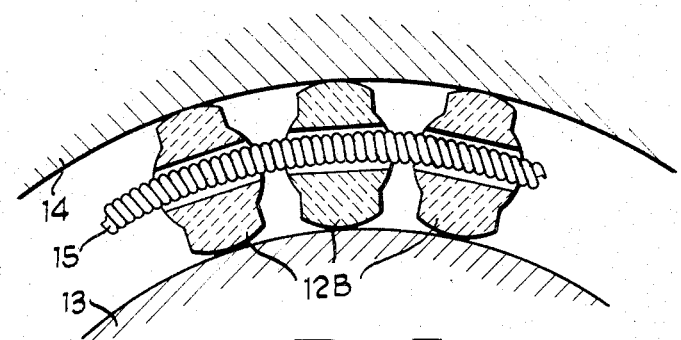

Other advantages and novel aspects of the invention will become appartent upon consideration of the following detailed description in conjunction with the following drawings wherein:

FIG. 1 is a partial sectional view taken through the axis of one form of a one-way clutch showing the ceramic clamping-components in conjunction therewith; and FIGS. 2 and 3 are views similar to FIG. 1 showing different forms of one-way clutches.

In FIG. 1 a resilient clamping-components cage 10 is shown having clamping-components receiving apertures 11 and is utilized to position clamping-components 12 between the inner and outer races 13 and 14, respectively, whereby the clamping components will be active to provide a driving force between the inner race 13 and the outer race 14 during one direction of relative rotation therebetween, and to provide an overrunning connection between the inner and outer races 13 and 14 during the opposite relative rotation therebetween.

In FIGS. 2 and 3 clamping-components 12A and 12B, respectively, are held in position due to their close proximity and spiral-type garter-springs 15 are utilized to force the clamping-components into position whereby the clamping components will perform as described above between the inner races 13 and outer races 14.

The clamping-components 12, or 12A, or 12B, as the case may be, of this invention are composed of ceramic material. It has been discovered that an alumina ceramic provides the desirable objects of this invention. In particular, it has been found that the objects of this invention are provided when the clamping-components are composed of an alumina ceramic with a high $Al_2O_3$ content, as for example, about 90 percent and more $Al_2O_3$, and preferably of substantially pure $Al_2O_3$. As an example, on having 99.98 percent $Al_2O_3$ with a specific gravity of 3.96 has proved very satisfactory.

It is to be understood that the invention is not to be limited to the specific construction and arrangements shown and described, as it will be understood to those skilled in the art that changes may be made without departing from the principles of the invention.

I claim

1. In a one-way overrunning type clutch comprising the combination of an inner race member, an outer race member, and means for operatively retaining clamping-components between said outer and said inner race to provide a drive connection therebetween in one direction and an overrunning connection in the opposite direction, the improvement in which said clamping-components are ceramic.

2. A one-way overrunning clutch as defined in claim 1 wherein said ceramic is an alumina ceramic.

3. A one-way overrunning clutch as defined in claim 2 wherein said alumina ceramic is $Al_2O_3$.

4. A one-way overrunning clutch as defined in claim 2 wherein said alumina ceramic is 99.98 percent pure $Al_2O_3$.

5. A ceramic clamping component for a one-way overrunning clutch retained between an inner and an outer race to provide a driving connection therebetween in one direction and an overrunning connection in the opposite direction.

6. A clamping-component as recited in claim 5 wherein said ceramic is an alumina ceramic.

7. A clamping-component as recited in claim 6 wherein said alumina ceramic is $Al_2O_3$.

8. A clamping-component as recited in claim 6 wherein said alumina ceramic is 99.98 percent pure $Al_2O_3$.

* * * * *